United States Patent

[11] 3,555,969

| [72] | Inventor | Naren M. Shah |
| | | Santa Monica, Calif. |
| [21] | Appl. No. | 751,233 |
| [22] | Filed | Aug. 8, 1968 |
| [45] | Patented | Jan. 19, 1971 |
| [73] | Assignee | Bell Aerospace Corporation |
| | | a corporation of Delaware |

[54] SERVOVALVE HAVING DYNAMIC LOAD ADAPTIVE RESPONSE WHILE MAINTAINING STATIC PERFORMANCE UNAFFECTED
9 Claims, 2 Drawing Figs.

[52] U.S. Cl. .................................................. 91/461,
91/363, 91/365, 137/85, 137/625.62, 137/625.63,
137/625.64
[51] Int. Cl. ........................................................ F15b 9/07
[50] Field of Search .................................... 137/(Inquired),
625.61, 625.62, 625.63, 625.64;
91/433, 461

[56] References Cited
UNITED STATES PATENTS

| 2,688,314 | 9/1954 | Holm et al. .................. | 91/461 |
| 3,042,005 | 7/1962 | Gray ............................ | 137/625.62X |
| 3,064,627 | 11/1962 | Blanton ...................... | 91/433X |
| 3,095,906 | 7/1963 | Kolm, Jr. ..................... | 137/625.62 |
| 3,258,025 | 6/1966 | Howland ..................... | 137/625.64X |
| 3,260,273 | 7/1966 | Hayner ........................ | 137/625.64X |
| 3,296,867 | 1/1967 | Schwien ...................... | 137/86X |
| 3,311,123 | 3/1967 | Tsien et al. .................. | 137/625.64X |
| 3,390,615 | 7/1968 | Hayner et al. ............... | 137/625.62X |

*Primary Examiner*—Martin P. Schwadron
*Assistant Examiner*—Irwin C. Cohen
*Attorney*—Nilsson, Robbins, Wills & Berliner

ABSTRACT: Disclosed is an electromagnetic hydraulic servovalve which receives input signals to control a pilot stage which in turn positions a power valve responsively thereto. The positioning of the power valve controls the flow of fluid under pressure from a source thereof to an actuator which in turn positions the load connected thereto. An intermediate stage of amplification may be inserted between the pilot stage and the power valve if such is desired. A pressure regulator is inserted between the source of fluid under pressure and the input to the pilot stage and/or the intermediate stage of the servovalve. The pressure regulator is responsive only to absolute load changes and in accordance therewith has the differential pressure appearing across the actuator applied to the pressure regulator. In response to a static or dynamic load condition a pressure drop directly proportional to the amount of the pressure difference appearing across the actuator is caused to occur in the fluid applied to the input stages (the pilot or intermediate stage). By regulating the pressure applied to the input stages, the velocity of movement of the power valve and subsequently the acceleration of the actuator ram are controlled. The fluid pressure to the power valve is not subjected to the pressure regulation by the pressure regulator, hence the static performance of the system is maintained.

INVENTOR
NAREN M. SHAH

By Nilsson + Robbins
ATTORNEYS

SERVOVALVE HAVING DYNAMIC LOAD ADAPTIVE RESPONSE WHILE MAINTAINING STATIC PERFORMANCE UNAFFECTED

FIELD OF THE INVENTION

The field of the invention is electrohydraulic load positioning apparatus.

BACKGROUND OF THE INVENTION

The basic characteristic of conventional electrohydraulic load positioning servovalve mechanisms is to apply full system pressure to the actuator almost instantaneously with the application of a minimum unbalancing signal to the power valve from the input stages. Such rapid application of full system pressure results in maximum actuator force being applied to the load connected to the actuator. If the load consists of apparatus having large inertia, the overall result is imposition of excessive acceleration forces to the load structure. It is, therefore, desirable that application of actuator force to the load be more gradual so that resistance of the load mass to acceleration does not impose destructive stresses upon the structure coupling the load to the actuator. That is, actuator ram acceleration must be controlled.

Numerous systems have been devised in an attempt to solve the foregoing problems. For example, reference is made to U.S. Pat. No. 3,042,005 issued July 3, 1962 to S.A. Gray and entitled, "Dynamic Pressure Feedback Servo-Valve"; U.S. Pat. No. 3,064,627 issued Nov. 20, 1962 to John W. Blanton and entitled, "Derivative Load Pressure Feedback"; and to U.S. Pat. No. 3,138,072 issued June 23, 1964 to S.A. Gray and entitled, "Dynamically Variable Orifice for Load Damping."

Although valves of the type disclosed in these prior art patents have proven exceedingly successful for purposes intended, it has been found that a demand exists for a system which will accomplish the desired end but which is more inexpensive to construct, has greater reliability, and is less susceptible to contamination in the hydraulic fluid. Furthermore, in certain of the prior art systems, a part of the hydraulic flow from the power valve to the actuator is bypassed and sometimes returned to system return. In such a system a hydraulic power supply for the fluid under pressure having a greater capacity is necessary to provide that portion of the fluid under pressure which is bypassed.

SUMMARY OF THE INVENTION

A servovalve system which is automatically adaptive to the dynamic load applied thereto in accordance with the present invention includes an actuator and a source of fluid under pressure. Also included is a power valve which controls the flow of fluid from the source to the actuator. An input stage is provided to supply fluid pressure signals to the power valve responsive to input signals applied thereto. A pressure regulator is connected between the source of fluid and the input stage and is responsive to pressure differentials in the actuator to regulate the fluid pressure applied to the input stage and thereby the pressure signals applied to the power valve. Thus, by regulating the pressure applied to the input stage, the velocity of movement of the power valve is controlled. By controlling the velocity of the movement of the power valve, the acceleration of the actuator ram is in turn controlled.

DESCRIPTION OF THE ILLUSTRATIVE EMBODIMENTS

Figure 1:
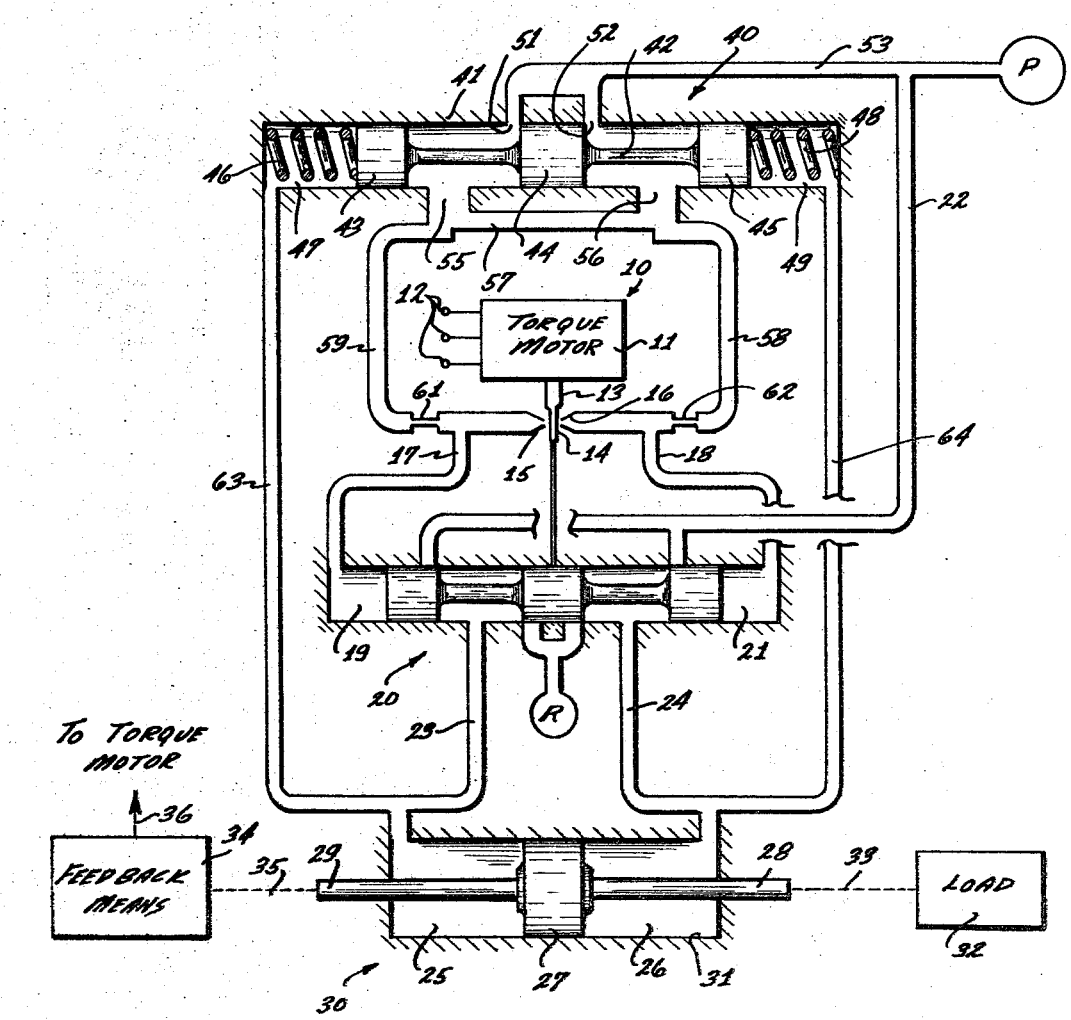
FIG. 1 is a schematic diagram of an electrohydraulic servovalve having a pressure regulator disposed between the source of fluid under pressure and the pilot stage.

Referring now to FIG. 1, there is disclosed an electrohydraulic servovalve having an input stage 10 including a torque motor 11 adapted to receive input signals on terminals 12 so as to position an armature 13 and thereby position a flapper 14 with respect to a pair of nozzles 15—16. As the flapper 14 moves with respect to the nozzles 15—16, a pressure differential is created therein which is applied through the conduits 17 and 18 to chambers 19 and 21 respectively, thereby applying the differential in pressure to opposite ends of the power valve 20. As is illustrated, the power valve 20 controls the flow of hydraulic fluid under pressure from the source P thereof through a conduit 22 and conduits 23 and 24 to the chambers 25 and 26 respectively positioned on opposite sides of the actuator piston 27 forming a part of the load positioning means. Rods 28 and 29 are connected to the piston 27 to form an actuator ram which moves within the cylinder 31, the ram and the cylinder constituting the actuator stage 30. A load 32 is connected to the rod 28 as is illustrated by the dashed line 33. A feedback means 34 is connected to rod 29 as indicated by the dashed line 35. The output of the feedback means is connected through a connection 36 as a feedback signal to the torque motor 11. The feedback signal may be electrical or mechanical or a combination thereof as may be desired in any particular application.

The structure described above is well known in the prior art and further and detailed descriptions and operations thereof may be obtained by reference to prior art patents, such for example as U.S. Pat. No. 2,947,286 issued Aug. 2, 1960 to G.T. Baltus et al. and entitled "Integrated Actuator." In summary, an input stage 10 receives input signals and provides an output pressure signal which controls the positioning of a power valve 20 which in turn controls the application of fluid under pressure to an actuator stage 30 thereby to position the load 32.

In accordance with the present invention, the velocity of movement of the power valve stage 20 is controlled by a pressure regulator means 40 which is inserted between the source of fluid under pressure P and the input stage 10. As is illustrated, the regulator means 40 includes a cylinder 41 having a first spool valve 42 slidably disposed therein. The spool valve includes lands 43, 44 and 45 interconnected by rods as is well known in the art. Spring means 46 is disposed between land 43 and the end wall of the chamber 47 in the cylinder 41 while spring means 48 is disposed between the land 45 and the chamber 49 formed at the opposite end of the cylinder 41. Thus, the spool 42 is spring-loaded by the springs 46 and 48 to a neutral position as illustrated. The cylinder 41 defines ports 51 and 52 which are connected by way of conduit 53 to the source P of fluid under pressure. Cylinder 41 also defines ports 55 and 56 which are connected together by conduit 57. Conduit 58 connects conduit 57 to nozzle 16 while conduit 59 connects conduit 57 to the nozzle 15. Appropriate restriction orifices 61 and 62 are disposed in the conduits 59 and 58 respectively as is well known in the prior art. A conduit 63 connects chamber 25 from the actuator stage 30 to chamber 47 of the pressure regulator stage 40 while a similar conduit 63 connects the chamber 26 with the chamber 49. By the connection of the conduits 63 and 64 pressure differentials appearing across the piston 27 also appear across the spool 42.

To accomplish the desired pressure regulation the ports 51 and 52 are designed such that when they are fully opened, as illustrated in FIG. 1, the full amount of pressure provided by source P is applied to the conduits 58 and 59 providing fluid through the respective restriction orifices to the nozzles 16 and 15 respectively. However, upon movement in either direction of the spool 42 the land 44 closes, to a greater or lesser degree, the input port 51 or 52, depending upon the direction of movement of the spool 42. As either of the ports 51 and 52 are closed, a pressure drop occurs thereacross, thus reducing the pressure which is applied through the conduits 58 and 59 to the nozzles 16 and 15 respectively. As the pressure is reduced, the pressure differential applied across the power valve stage is also reduced, thereby decreasing the velocity of movement of the power valve, which, subsequently reduces the ram acceleration.

The degree of movement of the spool 42 in the pressure regulator stage 40 is directly proportional to the pressure difference across the piston 27 in the actuator stage 30. Thus if a large pressure differential occurs, the land 44 of the spool 42 may completely block one or the other of the ports 51 and 52 and thereby substantially reduce the input pressure to the input stage 10, for example to one-half its full value. By so doing the acceleration of the ram is substantially reduced thereby eliminating the possibility of damage to the load 32 or the linkages connecting the ram thereto.

It should be expressly noted that the source of fluid under pressure P as applied through the power valve stage 20 to the actuator stage 30 is not subjected to the pressure regulation by the pressure regulator 40. As a result thereof, the static stiffness of the system is maintained; that is, the piston 27 will have minimum movement responsive to forces applied by the load 32 under static conditions.

Figure 2:
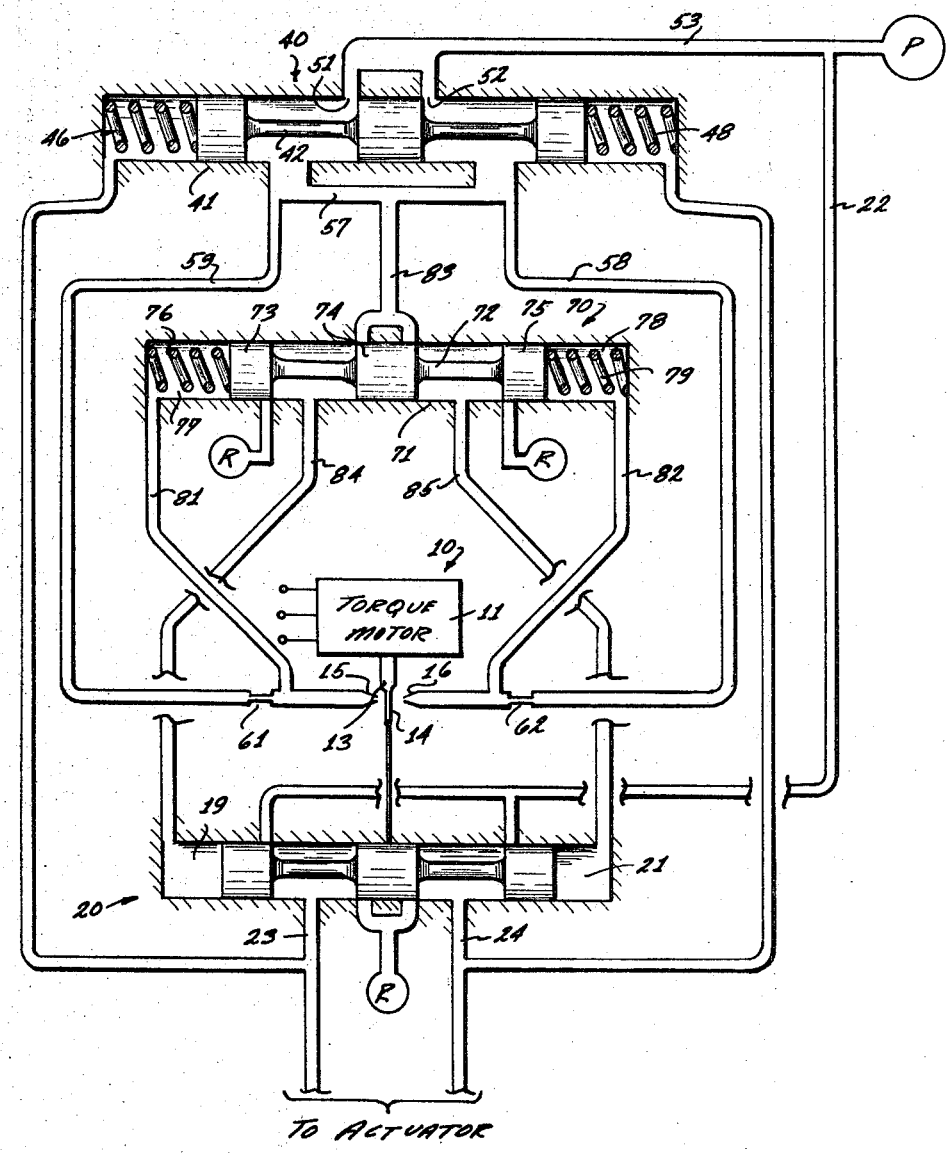
FIG. 2 is a schematic diagram of a system similar to that shown in FIG. 1 but including an intermediate stage of amplification having the fluid under pressure applied thereto also regulated.

It is sometimes desirable to provide additional stages of amplification between the nozzle-flapper pilot or input stage as illustrated in FIG. 1. Such a system is illustrated in FIG. 2 to which reference is hereby made. Various of the elements illustrated in FIG. 2 are the same or similar to those illustrated in FIG. 1 and therefore will not be described in detail. Wherein reference to them is made, the same reference numerals as used in FIG. 1 with respect thereto will be utilized.

As is shown in FIG. 2, an intermediate stage of amplification 70 is provided between the input stage 10 and the power valve stage 20. The intermediate stage 70 of amplification includes a cylinder 71 having a spool 72 slidably positioned therein. The spool 72 includes lands 73, 74 and 75 interconnected by a rod, as is well known in the prior art. Spring means 76 is positioned within a chamber 77 and abuts the land 73 while within a chamber 78 a similar spring means 79 is positioned and abuts the land 75. Conduit means 81 and 82 interconnect the nozzles 15 and 16 respectively with the chambers 77 and 78 of the cylinder 71. The land 74 controls the flow of fluid under pressure from the conduit 83 and through the conduits 84 and 85 to the chambers 19 and 21 at each end of the third spool valve of the power valve stage 20. It should be noted that the conduit 83 is connected to the interconnecting conduit 57 which receives the regulated flow of fluid under pressure from the pressure regulator stage 40.

It should now become apparent that as pressure differentials occur across the actuator, the spool 42 in the pressure regulator 40 moves, thereby reducing the pressure applied to the nozzles 15 and 16 as above described. The output from the nozzles 15 and 16 is in turn applied to the chamber 77 and 78 respectively, thereby to cause the spool 72 to translate within the cylinder 71. Such translation interconnects the conduits 84 and 85 with the source of regulated pressure (conduit 83) or system return R as shown, depending upon the direction of movement of the spool 72. Therefore, the regulated pressure or return as the case may be is applied to opposite ends of the power valve stage which applies fluid under pressure directly from the source P thereof the to the actuator as above described.

Although in FIG. 2 the regulated pressure is shown being applied to the pilot valve and the intermediate stage of amplification simultaneously, it should be expressly understood that the regulated pressure may be applied to either of these stages individually to accomplish any desired degree of control of the velocity of the power valve stage.

I claim:
1. In an electrohydraulic load positioning system comprising actuator means, including first and second pressure chambers, for positioning a load; power valve means operatively connected to supply fluid pressure to said pressure chambers of said actuator means; input stage means responsive to input signals for providing pressure signals to said power valve means; and means for connecting a source of fluid under pressure to said input stage means; a pressure regulator in said connecting means comprising:
  a housing defining a cavity having input and output port means;
  first conduit means for connecting a source of fluid under pressure to said input port means;
  second conduit means for connecting said output port means to said input stage means;
  pressure responsive means mounted in said cavity and when in a neutral position permitting unimpeded fluid flow from said input to said output port means and movable from said neutral position to impede flow of fluid through said output port means and thereby reduce the pressure applied to said input stage means; and
  third conduit means connecting said first and second chambers of said actuator means to said pressure responsive means, the movement of said pressure responsive means being effected solely by fluid pressure transmitted by said third conduit means.

2. A system as defined in claim 1 wherein said pressure responsive means is a first spool valve having first and second ends connected respectively to said first and second chambers, said first spool valve throttling said input port means upon movement thereof in response to pressure differences across said load positioning means.

3. A system as defined in claim 2 wherein said input port means includes a cylinder defining first and second openings and said first spool valve moves responsively to pressures across said load positioning means to decrease the area of one of said openings.

4. A system as defined in claim 2 wherein said input stage means includes a pair of nozzles having a flapper disposed therebetween and movable in response to signals applied thereto, said nozzles being individually connected to said output port means.

5. A system as defined in claim 4 wherein said power valve means is a power spool having equal end areas each connected individually to one of said nozzles, said power valve being adapted for connection directly to a source of fluid under pressure.

6. A system as defined in claim 4 which further includes a second spool valve for connection between a source of fluid under pressure and said power valve means, said second spool valve having equal end areas individually connected to each of said nozzles.

7. A system as defined in claim 6 wherein said second spool valve is connected to said output port means.

8. A system as defined in claim 6 wherein said power valve means is a third spool valve having equal end areas connected to said second spool valve, said third spool valve being adapted for connection directly to a source of fluid under pressure.

9. A system as defined in claim 7 wherein said power valve means is a third spool valve having equal end areas connected to said second spool valve, said third spool valve being adapted for connection to a source of fluid under pressure.